United States Patent [19]

Peranio

[11] Patent Number: 4,882,052
[45] Date of Patent: Nov. 21, 1989

[54] FILTER STRUCTURE FOR LIQUID PURIFICATION AND INCORPORATING DETENT ARRANGEMENT

[75] Inventor: Anthony Peranio, Nyack, N.Y.

[73] Assignee: Purewater Sciences International, Inc., New York, N.Y.

[21] Appl. No.: 111,869

[22] Filed: Oct. 23, 1987

[51] Int. Cl.⁴ .................. B01D 23/02; B01D 23/14
[52] U.S. Cl. .................... 210/282; 210/314; 210/451; 210/488; 210/489; 210/497.01
[58] Field of Search .......... 210/264, 282, 314, 316, 210/317, 451, 483, 488, 489, 497.01, 265, 439, 446

[56] References Cited

U.S. PATENT DOCUMENTS

| | | | |
|---|---|---|---|
| 4,059,528 | 11/1977 | Grosshandler | 210/282 |
| 4,283,283 | 8/1981 | Zimmerman | 210/282 |
| 4,352,735 | 10/1982 | Turetsky | 210/282 |
| 4,364,756 | 12/1982 | Clarke et al. | 210/282 |
| 4,448,695 | 5/1984 | Gordan, Jr. et al. | 210/282 |
| 4,711,718 | 12/1987 | Nelson, Jr. | 210/282 |

Primary Examiner—Richard V. Fisher
Assistant Examiner—Wanda L. Millard
Attorney, Agent, or Firm—Louis Weinstein

[57] ABSTRACT

A filter structure including inlet and outlet members between which is sandwiched a suitable filtration media, such as activated carbon and mechanical filters, either being taken alone or in combination with one another. The upper inlet member is provided with substantially circular arrays of openings being arranged at spaced intervals about imaginary circles of different diameters and having a common center. The openings further removed from the common center of the imaginary circles are of greater diameter. The surface in which the openings are provided tapers downwardly and outwardly from the aforementioned common center causing liquid deposited thereon to seek passage through the openings furthest removed from the aforesaid common center. The second, lower member is provided with three (3) sets of arrays similar to that provided in the upper inlet member. By indexing the two members relative to one another after preferably equal usage intervals have elapsed more efficient use of all of the filter material or more uniform use of all the filter material is assured. Indexing of the two members is facilitated by a cooperating projection and detents to simplify appropriate alignment.

19 Claims, 2 Drawing Sheets

FILTER STRUCTURE FOR LIQUID PURIFICATION AND INCORPORATING DETENT ARRANGEMENT

FIELD OF THE INVENTION

The present invention relates to filter structures for liquid filtration and more particularly to a novel filter structure comprised of relatively indexible members containing predetermined arrays of openings to facilitate more uniform use of the filtration medium interposed between the indexible members.

BACKGROUND OF THE INVENTION

The novel filter structure of the present invention is especially adapted for use in a variety of different types of liquid purification apparatus in which a filter medium is provided to remove impurities suspended and/or dissolved in the liquid as the liquid, containing impurities, is caused to flow through the filter apparatus.

One of the significant problems encountered in filter apparatus of the type in which the liquid being purified flows slowly into and through the filter, and especially when in the form of droplets falling into the inlet of the filter, is that, during downward passage through the filter medium, the liquid chooses a selective path(s), such that the liquid follows the path of least resistance. Such path(s), once established, tends to perpetuate itself. Accordingly, not of all of the filter medium responsible for removing contaminants, is used during the life of the filter or alternatively the filter medium is not used uniformly throughout its useful operating life.

As a result, the filtering action (i.e. removal of contaminants within the liquid) is not efficient and the apparatus does not avail itself of the benefical action of all of the filter medium.

BRIEF DESCRIPTION OF THE INVENTION

The present invention is characterized by comprising a filter structure which is particularly useful for purification applications wherein the contaminated liquid flows slowly, and typically in the form of droplets which pass to and through the filter by the action of gravity, flowing into the inlet of the filter and thereafter flowing slowly downwardly through the filtering medium, finally exiting from the outlet end of the filter. In this process, the filter medium acts upon the contaminated liquid to trap and otherwise remove substantial amounts of the contaminants entrained within the liquid being filtered.

The filter apparatus of the present invention is designed to cause the liquid introduced into and flowing through the filter medium to be deliberately compelled to follow a prescribed path. The path, which is far from being a haphazard or circuitous one, is relatively well defined in terms of the volume of filtered medium exposed to the liquid being filtered and to its contaminants that pass through the filter. Additionally, according to the design of the apparatus of the present invention, the rate of flow of the liquid through the smaller and limited volume of filter medium during any given cycle, is on the average of two or three times the velocity of the liquid passing through a filter design according to the previous art.

As will be made obvious from the description of the invention, approximately one-third or one-fourth of the filter medium is exposed to and caused to act upon the liquid being filtered during any given cycle. However, after a given cycle or decided-upon period, of use, and in accordance with the design of the apparatus of the present invention, an inlet plate of the filter is indexed causing an unused portion of the filter medium to be exposed to the liquid which thereafter passes through the filter apparatus. Here too, the liquid being filtered during the second cycle of the filter apparatus is compelled to follow a prescribed path through a second, unused volume of filtering medium.

The above process of indexing is followed by a third, or if desired several additional indexing operations, dependent upon the size and characteristics of the filter required, thereby exposing an unused volume of the filter medium during each new cycle to make better, more uniform use of the filter medium.

The present invention accomplishes the objectives and novel results through the use of inlet and outlet plates arranged respectively above and below the filter medium. The inlet plate is provided with a plurality of sets of openings, each set being arranged at spaced intervals about an imaginary circle, each imaginary circle being of increasing diameter and sharing a common center. Each set of openings is of substantially uniform diameter with the openings of those sets further removed from the common center being of greater diameter. The top surface of the inlet plate tapers downwardly and away from the common center to induce liquid deposited thereon to move toward and through the openings of largest diameter.

The outlet plate is provided with two or more arrays of the plural sets of openings provided in the inlet plate. Indexing means are provided for indexing the inlet and outlet plates relative to one another to successively guide the liquid flow through the filtration medium arranged between the plates so that maximum use is made of the filtration medium volume to assure most efficient use of the filtration medium and hence most efficient filtration of the liquid being filtered.

The objectives thus obtained through the novel apparatus of the present invention include:

(a) the definition of a prescribed and defined path of the liquid being filtered is made to the filter medium;

(b) the filter medium material is more fully utilized throughout the full operating life of the filter apparatus; and (c) the filter medium requires less frequent replacement since, through the indexing technique, the filter medium provides two to three times the useful operating life as compared with filters manufactured according to the conventional technique.

The apparatus of the present invention is particularly suited to the application of water purification, especially in the types of apparatus in which the liquid (water) is introduced at the inlet to the filter in the form of falling droplets. This method of water filtration and purification is described, for example, in U.S. application Ser. No. 872,162 filed July 9, 1986 (now abandoned) entitled METHOD AND APPARATUS FOR PURIFYING CONTAMINATED WATER and assigned to the assignee of the present application. The present application is also advantageous for use in the filter apparatus described in copending application Ser. No. 080,649 filed July 31, 1987 entitled CARTRIDGE TYPE FILTER FOR WATER PURIFICATION AND THE LIKE and assigned to the assignee of the present application, which descriptions are incorporated herein by reference thereto.

OBJECTS OF THE INVENTION AND BRIEF DESCRIPTION OF THE FIGURES

It is therefore one object of the present invention to provide a novel indexible filter apparatus for assuring better utilization of the filter medium employed therein.

Still another object of the present invention is to provide a novel filter apparatus for use in the filtration of liquids and comprising indexible inlet and outlet plates positioned on opposite sides of a filter medium and having openings arranged so that when indexed, the liquid being filtered is caused to pass through different unused volumes of the filter medium to make better, more uniform use of the filter medium.

Still another object of the present invention is to provide a novel filter apparatus for use in liquid filtration and comprised of upper and lower filter plates which are indexible relative to one another and wherein the upper plate is provided with through openings and a tapered upper surface to urge liquid deposited on said upper surface to seek to flow through inlet openings closest to the lower level of said tapered surface.

The above as well as other objects of the present invention will become apparent when reading the accompanying description and drawings in which.

DETAILED DESCRIPTION OF THE INVENTION

Figure 1:
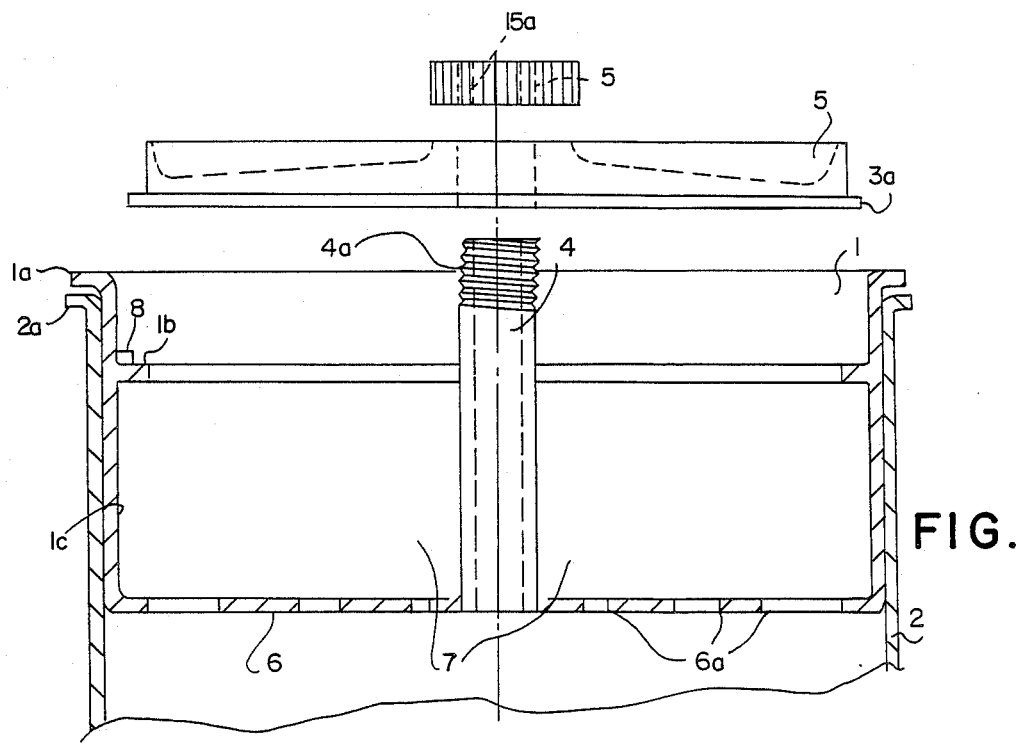
FIG. 1 is an exploded, partially sectionalized view of the invention which is used for identifying the major components of the filter apparatus and providing certain details of its construction.
Figure 2:
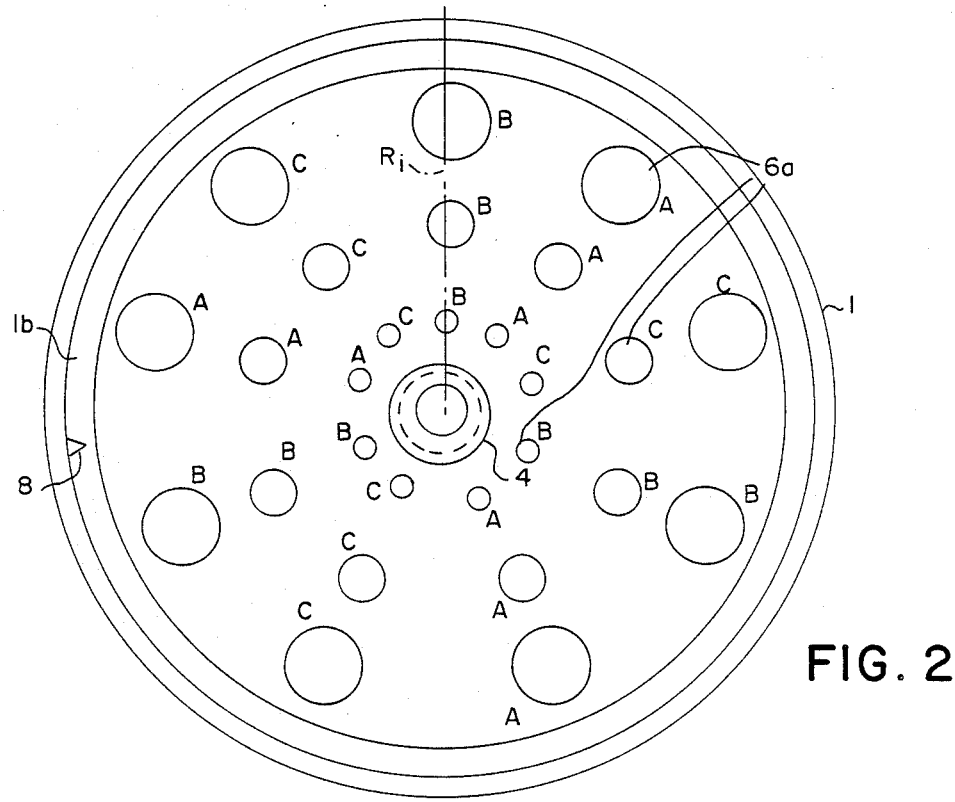
FIG. 2 is a top plan view of the basket of FIG. 1 showing the details of the aperture arrangement and the tooth employed for indexing the filter apparatus inlet and outlet plates.

FIG. 1 shows the filter basket 1 which is arranged within the top, open end of a vessel 2, the annular lip 1a resting upon the annular lip 2a. The vessel 2 and basket 1 may preferably form an integral part of a water purification apparatus as described, for example, in the aforementioned copending U.S. application Ser. No. 054,571 filed May 27, 1987 entitled METHOD OF AND ARRANGEMENT FOR PURIFYING CONTAMINATED WATER. The basket further comprises an integral bottom surface 6 provided with openings 6a to be described in greater detail hereinbelow. The basket is further comprised of an inwardly directed, annular, integral flange 1b which serves to slidably receive and support the outwardly directed flange 3a of indexing lid 3 to be more fully described. A hollow tubular-shaped center post 4 has its lower end integrally joined to the center of bottom plate 6 as shown and is provided with a threaded upper outer surface 4a for threadedly engaging the tapped opening 5a within nut 5.

A projection 8 is provided along the interior surface of the basket sidewall 1c at the location where the sidewall meets with inwardly directed flange 1b.

Indexing lid 3 is shown above basket 1 in the position in readiness to be lowered onto and centered by center post 4. Upon appropriate positioning so that flange 3a rests upon flange 1b, the structure is secured by nut 5 which threadedly engages the threaded portion 4a of post 4.

In actual operation, before indexing lid 3 is mounted upon basket 1, the cylindrical-shaped filter medium volume defined by basket 1 and indexing lid 3 is filled with filter material 7 suitable for providing the desired filtration and purification. For example, the filter apparatus may incorporate activated carbon sandwiched between upper and lower polyester fiber mats, not shown for purposes of simplicity. A suitable filter structure of the type generally described is set forth in copending application Ser. No. 080,751 filed July 31, 1987 (now U.S. Pat. No. 4,828,692) entitled SIMPLIFIED METHOD AND APPARATUS FOR PURIFICATION and assigned to the assignee of the present invention, the apparatus described therein being incorporated herein by reference thereto. However, any other suitable filter medium may be employed with equal success and still obtain the novel and unique advantages of the present invention.

Figure 3:
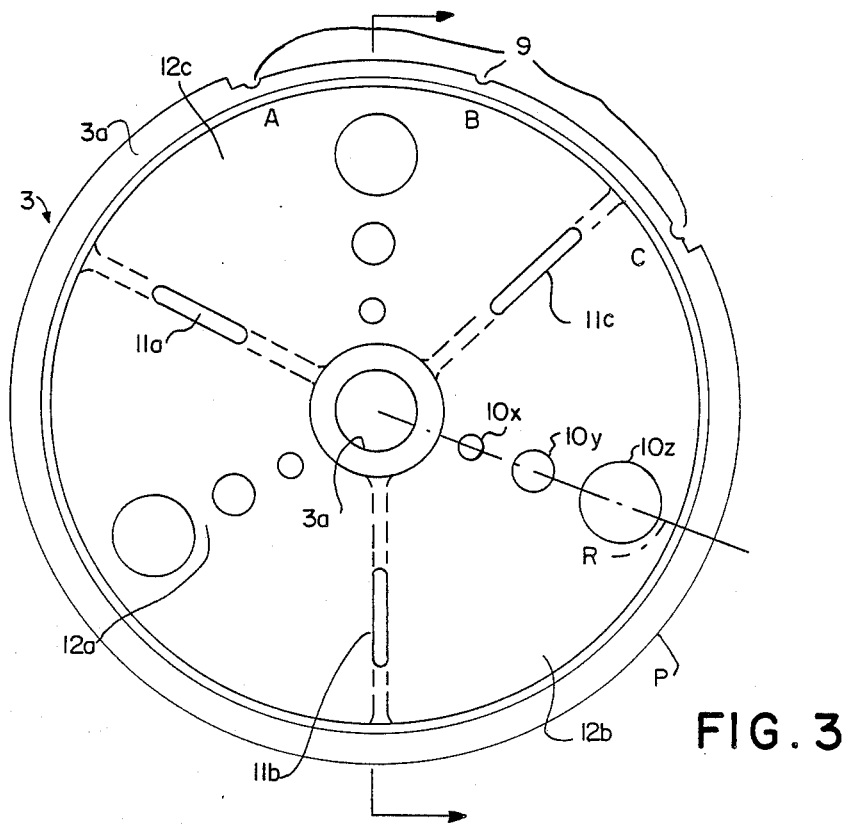
FIG. 3 shows a top plan view of the lid of the filter apparatus of FIG. 1.
Figure 4:
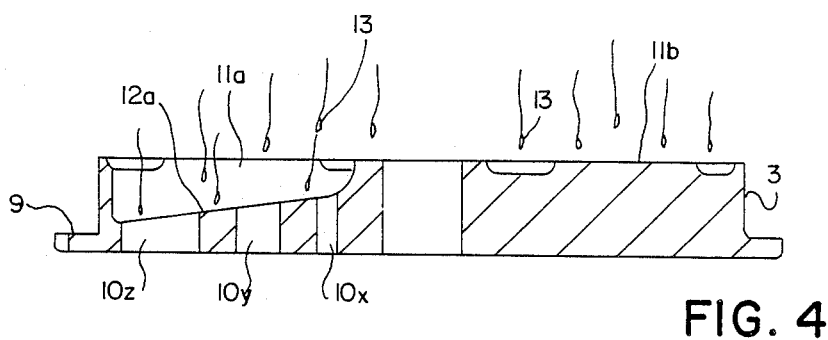
FIG. 4 is a sectional view of the lid of FIG. 3 looking in the direction of arrows 4—4 of FIG. 3 and showing details of its construction.

The indexing lid 3 is divided into three pie-shaped regions, each region being defined by upwardly extending, radially aligned projections 11a, 11b and 11c shown best in FIGS. 3 and 4. Each of the aforesaid pie-shaped regions 12a, 12b and 12c is comprised of a surface which tapers downwardly from the center of indexing lid 3 which is provided with a central opening 3a through which the upper end of center post 4 extends when indexing lid 3 is assembled upon basket 1. FIG. 4 shows one of the tapered surfaces 12a.

Each of the tapered surfaces 12a–12c is provided with a plurality of openings 10x through 10z so that the openings in each pie-shaped area have their centers lying upon a common imaginary radius such as radius R, for example. In addition thereto, all of the openings 10x of the 3 pie-shaped areas 12a through 12c have their centers lying on a common imaginary circle Cl, said centers being at equi-spaced (120 degree) intervals about the imaginary circles such as C1. As can clearly be seen, the openings 10y, 10z further removed from central opening 3a are of increasingly greater diameter, openings 10y being of greater diameter than openings 10x and openings 10z being of greater diameter than openings 10y. As a result, a proportionally greater volume of water flowing along the surface of indexing lid 3 of the filter apparatus is encouraged to distribute itself toward the outer circumference of lid 3 and hence the corresponding filter medium 7 positioned thereunderneath, as a result of the graduated sizes of the lid openings 10x through 10z with increasing distance from the center of indexing lid 3 and by pitching or sloping the upper surface of indexing lid 3 to form three troughs 12a through 12c. In use, as water droplets 13 fall upon the top surface of indexing lid 3 they are caused to roll down the three troughs and ultimately flow through the three sets of openings 10x through 10z, with the correspondingly greater volume of liquid flowing through outer openings 10z.

The bottom surface 6 of basket 1, which serves as the filter apparatus outlet plate, is provided with three different arrays A, B and C, each of said arrays having openings which are substantially identical in size and location to the array provided in indexing lid 3. For example, considering the array A, the openings extending along each imaginary radius are increasingly greater in diameter in moving from the center of plate 6 toward the outer circumference with each of the imaginary radial lines, such as R1, being arranged equi-spaced (i.e., at 120 degree intervals). The arrays B and C are similarly arranged and are further displaced from one another so as to be spaced at 40 degree intervals for each adjacent array, for example.

Indexing lid 3 is provided with a section of the outer perimeter of flange 3a which is of reduced diameter, with said section of reduced diameter being provided with notches 9 arranged at 40 degree intervals. Indexing lid 3 is placed so that its flange 3a rests upon support flange 1b in the manner shown in FIG. 1 and with a cut-a-way portion of flange 3a being arranged so that projection 8 is located between the extreme ends of the cut-a-way portion. By rotating indexing lid 3 so as to bring the indexing notch 9 identified as "A" in alignment with projection 8, the openings provided in indexing lid 3 are positioned so as to be immediately above associated ones of the openings of array A in plate 6. Similarly, by rotating indexing lid 3 so as to place projection 8 in the notch labelled "B" the openings in indexing lid 3 will be positioned immediately above associated ones of the openings of array B in plate 6. Similarly, the openings in indexing lid 3 may be aligned with associated ones of the openings of array C in plate 6 by rotating indexing lid 3 so as to position projection 8 in the notch labelled "C".

When the filter apparatus is first in use, projection 8 is positioned within the "A" notch to align the openings in indexing lid with the corresponding openings of array "A" in plate 6. Accordingly, as water droplets enter the filter apparatus through the series of openings 10x through 10z in indexing lid 3, the collected water will flow downwardly through filter medium 7 in three specific wedges centered about all of the openings in the array "A" in plate 6. The water then flows downwardly and predominantly out of the holes of array A. However, a small amount of water may also flow out of the holes in the arrays designated "B" and "C" in plate 6 arranged on opposite sides of the openings of the array "A".

After a given period of time, for example, one month of use in the case of a water purifier of a size normally employed in the average home, the tabs or projection 11a through 11c are grasped, said tabs being provided to facilitate indexing of lid 3, to rotate lid 3 counterclockwise to place projection 8 in the indent slot designated "B", thereby indexing lid 3 by 40 degrees relative to basket 1. Thus the openings in indexing lid 3 are now aligned immediately above associated ones of the openings in the array "B" of plate 6. The water purification apparatus is now ready to purify water through another cycle of operation utilizing a volumetric portion of the filtered medium which was substantially unused during the first month cycle.

After the filter apparatus has been used through a second month of operation, the indexing lid 3 is indexed in a similar fashion to insert tooth 8 into detent "C" for use, for example, for a third month of operation. After the filter medium utilized during the third cycle has been used for approximately a month, then the totally expended filtered medium 7 may be removed from filter basket 1 and replaced by a new filter medium.

The filter basket 1 may, for example, be made of stainless steel. However, an alternative material is polypropylene. When using a stainless steel basket, tooth 8 is preferably constructed of a light sheet spring whereas when using the plastic material such as polypropylene, this material is sufficiently compressible so that through dimensional control, suitable friction and detent action will be obtained between projection 8 and the detent notches 9 to assure simple and yet accurate indexing. As an alternative arrangement, the notches 9 may be provided along the interior surface of sidewall 1c above flange 1b (for example, in the form of openings or shallow depressions) and the projection may be in the form of a projection or tab extending slightly beyond the perimeter P of flange 3a.

A recommended material for lid 3 is transparent polycarbonate.

It can be seen from the foregoing that the present invention effects optimum use of the filter medium material by direction of the fluid evenly throughout specified volumetric portions of the filter medium.

The design of the filter structure causes less liquid to be distributed to the central part of the filter medium (where there is minimum volume) than through the outer circumferential portion of the filter (where there is maximum volume).

The apparatus of the present invention further provides a filter apparatus design which requires less frequent replacement of the filter medium by affording more uniform and efficient use of the filter medium that is employed. And, due to the timed use of the filter medium, the filter medium can be used for a relatively long period before requiring replacement, especially as compared with conventional filter apparatus.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

For example, greater and lesser numbers of arrays may be provided in outlet plate 6 to provide for a greater or lesser number of indexing operations to provide more uniform and efficient use of the filter medium.

What is claimed is:

1. Filter apparatus for directing the gravity-feed flow of liquid therethrough, comprising:
   a filter medium;
   inlet and outlet plates arranged respectively above and below said filter medium;
   said inlet and outlet plates each having openings to respectively provide for the flow of liquid therethrough;
   said inlet plate having openings arranged in a predetermined array;
   said outlet plate having a plurality of arrays of openings each being substantially similar to the array of openings in said inlet plate whereby the number of arrays in said outlet plate is substantially equal to 2 more than the number of arrays in said inlet plate; and
   said plates being movable relative to one another to adjustably position the array of said inlet plate substantially directly above one of the arrays in said outlet plate to guide the liquid flow through substantially that portion of the filter medium which is arranged between the aligned arrays of said inlet and outlet plates.

2. The filter apparatus of claim 1 wherein the inlet plate is substantially circular and said array comprises a plurality of sets of openings, each set of openings being arranged at spaced intervals along imaginary circles of different diameters.

3. The filter apparatus of claim 2 wherein the openings in each set are circular and are of substantially the same diameter.

4. The filter apparatus of claim 3 wherein the openings in each set are of different diameters.

5. The filter apparatus of claim 4 wherein the diameters of the openings in each set increase with increasing distance from the center of the inlet plate.

6. The filter apparatus of claim 4 wherein said imaginary circles all have a common center.

7. The filter apparatus of claim 1 wherein said filter medium is comprised of activated charcoal.

8. The filter apparatus of claim 7 wherein said activated charcoal is in granular form.

9. The apparatus of claim 8 wherein mechanical filters are placed between said activated charcoal and said inlet and outlet plates.

10. The apparatus of claim 9 wherein said mechanical filters are comprised of filter pads of commingled fibers.

11. The apparatus of claim 1 wherein said inlet and outlet plates are provided with a plurality of indexing notches arranged at spaced intervals along the periphery of said plates and being equal in number to the number of arrays provided in said outlet plate;
an indexing tooth associated with the remaining one of said inlet and outlet plates and arranged to be receive by one of said notches for appropriately indexing the array in said inlet plate relative to said outlet plate.

12. The filter apparatus of claim 11 wherein said notches are provided along the periphery of said inlet plate and said indexing teeth is associated with said outlet plate.

13. The filter apparatus of claim 11 wherein said inlet plate is circular in shape and is provided with an outer flange for resting upon an annular support flange provided in a basket member;
a tooth being provided in said basket member adjacent to said support flange;
said inlet plate flange having a peripheral portion thereof of reduced diameter;
said indexing notches being arranged at spaced intervals along the periphery of the reduced diameter portion of said flange for engagement with said indexing tooth to align the array of openings in said inlet plate with an associated one of the plural arrays in said outlet plate.

14. The filter apparatus of claim 1 wherein said inlet plate is provided with a sloping upper surface which slopes downwardly and away from the center thereof for normally urging liquid impinging thereon toward the outer perimeter of said inlet plate.

15. The filter apparatus of claim 1 wherein said inlet plate further comprises means for directing the greater amount of liquid delivered to said inlet plate toward the outer regions of said filter medium and directing increasingly smaller amounts of the liquid to be filtered toward the interior region of said filter medium.

16. The filter apparatus of claim 1 further comprising a basket-shaped member having a cylindrical-shaped sidewall;
said outlet plate integrally joined to the lower end of cylindrical-shaped sidewall and forming the bottom of said basket-like member;
said filter medium being supported on said outlet plate.

17. Filter apparatus for directing the flow of liquid therethrough, comprising:
a filter medium;
inlet and outlet plates arranged respectively above and below said filter medium;
said inlet and outlet plates each having openings to respectively provide for the flow of liquid therethrough;
said inlet plate having openings arranged in a predetermined array;
said outlet plate having a plurality of arrays of openings each being substantially similar to the array of openings in said inlet plate;
said plates being movable relative to one another to adjustably position the array of said inlet plate substantially directly above one of the arrays in said outlet plate to guide the liquid flow through substantially that portion of the filter medium which is arranged between the aligned arrays of said inlet and outlet plates;
a basket-shaped member having a cylindrical-shaped sidewall;
said outlet plate integrally joined to the lower end of cylindrical-shaped sidewall and forming the bottom of said basket-like member;
said filter medium being supported on said outlet plate;
a center post having a lower end secured to said outlet plate near the central portion thereof and extending upwardly therefrom; and
said inlet plate having a central opening for receiving the upper end of said center post.

18. The apparatus of claim 17 wherein said cylindrical-shaped sidewall is provided with an inwardly directed flange for receiving and supporting the circumferential marginal portion of said inlet plate.

19. The apparatus of claim 18 wherein the upper end of said center post is provided with a threaded portion which extends above the top surface of said inlet plate; and
a tapped nut for threadedly engaging the threaded portion of said center post for retaining said basket-like member and said inlet plate in the assembled position.

* * * * *